United States Patent [19]

Dilling et al.

[11] Patent Number: 4,748,235

[45] Date of Patent: May 31, 1988

[54] METHOD OF PRODUCING IMPROVED AMINE SALTS OF LIGNOSULFONATES

[75] Inventors: Peter Dilling, Isle of Palms; Susan L. Schlegel, Goose Creek, both of S.C.

[73] Assignee: Westvaco Corporation, New York, N.Y.

[21] Appl. No.: 38,955

[22] Filed: Apr. 16, 1987

Related U.S. Application Data

[63] Continuation-in-part of Ser. No. 859,384, May 5, 1986, Pat. No. 4,715,864.

[51] Int. Cl.[4] ................................................. C07G 1/00
[52] U.S. Cl. ..................................... 530/501; 530/505
[58] Field of Search ................................ 530/501, 505

[56] References Cited

U.S. PATENT DOCUMENTS

| | | | |
|---|---|---|---|
| 3,407,188 | 10/1968 | Cavagna | 530/501 |
| 3,505,243 | 4/1970 | Steinberg et al. | 530/500 X |
| 4,047,567 | 9/1977 | Childs et al. | 530/501 X |
| 4,444,562 | 4/1984 | Lin | 530/500 X |
| 4,590,262 | 5/1986 | Dilling | 530/501 X |
| 4,629,469 | 12/1986 | Dilling | 530/501 X |
| 4,636,224 | 1/1987 | Dilling | 530/501 X |
| 4,642,336 | 2/1987 | Dilling | 530/501 X |

*Primary Examiner*—Earl Nielsen
*Attorney, Agent, or Firm*—Terry B. McDaniel; Richard L. Schmalz

[57] ABSTRACT

A method of producing an amine-containing salt of a sulfonated lignin compound which may be effectively spray-dried for use in dry form comprising the steps of methylolating a lignin at an alkaline pH, lowering the pH of the methylolated lignin to precipitate the lignin, washing the precipitated lignin at an acid pH to remove impurities, sulfonating the methylolated lignin in the presence of a sulfur-oxygen-containing compound, an amine compound, and ammonium hydroxide and/or ammonium sulfite or bisulfite to produce an amine/ammonium salt thereof, and heating and spray-drying the sulfonated lignin amine/ammonium salt to effectively evaporate ammonia therefrom to produce the sulfonated lignin amine-containing salt in dry form.

6 Claims, No Drawings

METHOD OF PRODUCING IMPROVED AMINE SALTS OF LIGNOSULFONATES

This application is a continuation-in-part of co-pending, commonly assigned U.S. patent application Ser. No. 859,384 filed May 5, 1986, U.S. Pat. No. 4,715,864. This invention relates to a method of producing amine-containing salts of lignosulfonates suited for use as additives in other chemical compositions, such as dyestuffs, and, more particularly, to a method of producing improved amine-containing lignosulfonate salts which may be effectively spray-dried for storage, shipment, and sale in a dry powder or granular form.

BACKGROUND OF THE INVENTION

As is well known, lignin is a complex, high-molecular weight polymer occurring naturally in close association with cellulose in plants and trees. Lignin constitutes, on a dry weight basis, approximately 27% to 33% of the tree in softwoods and approximately 20% to 24% in hardwoods. In the paper-making industry, lignin is recovered as a by-product of the cellulose product by two principal pulping processes known as the sulfite process and the kraft process. In the sulfite pulping process, lignin is solubilized from the cellulosic portion of the wood pulp by direct sulfonation, while the kraft process is based on an alkaline degradation mechanism causing cleavage of $\beta$-aryl ether linkages in the polymeric lignin which subsequently results in chemical functions of the phenolic and carboxylic type. Kraft lignin is isolated by acid precipitation from the black liquor of a kraft pulping process at a pH below the pKa of the phenolic groups.

The high degree of chemical activity which is characteristic of lignin salts permits the preparation of many novel and economical organic derivatives. Typical reactions which lignins can undergo are hydrogenation, halogenation, nitration, sulfonation, oxygenation, salt formation, etherification, and esterification. Lignin by-products variously have been employed in various chemical compositions as a surfactant, extender, dispersant, reinforcement, absorbent, binder, sequestering agent, emulsifier and emulsion stabilizer, and as a stabilizing and protective colloid. Lignosulfonate compounds, particularly sodium salts of lignosulfonates, have been employed as additives and dispersants in textile dyestuffs and printing pigments. Sodium salt sulfonated lignin by-products have been sold for many years under the trademark Indulin ® by Westvaco Corporation of North Charleston, S.C.

Reduction in the pH of black liquor containing soluble lignin salts generally may be accomplished by introduction of carbon dioxide which converts the phenolic hydroxyl groups on the lignin molecule, which are in ionized form, into their free phenolic or acidic form. This conversion renders the lignin insoluble in the black liquor, and, as a result, it precipitates out. To precipitate the alkali lignin from the black liquor, the pH of the black liquor, initially around 13, is lowered to a pH of about 10.5 at which point lignin precipitation begins. Lignin obtained from the kraft process is not recovered as a sulfonated by-product, but is sulfonated, if desired, by reacting the material with a sulfur and oxygen-containing compound. Sulfonated lignins are understood to be those containing at least an effective amount of sulfonate groups to give water solubility in moderately acid and higher pH solutions.

One conventional process for sulfonating kraft lignins involves sulfomethylation of the alkali lignin by reacting the lignin with sodium sulfite and formaldehyde. Such a process is described in Adler, et al. U.S. Pat. No. 2,680,113. More recently, it has been proposed to sulfomethylate kraft process lignins in a two-step operation where the ionized phenol component of the lignin is methylolated at an alkaline pH by the addition of an aldehyde, the pH is then lowered to acid to precipitate the methylolated lignin and wash the precipitate to remove undesired inorganic salts, and the lignin thereafter sulfonated by addition of a salt, typically sodium, and also ammonium, of a sulfur and oxygen-containing compound. Such processes are described in commonly assigned U.S. Pat. No. 4,590,262 which issued May 20, 1986, and U.S. Pat. No. 4,642,336 which issued Feb. 10, 1987.

More recently, it has been proposed to produce sulfomethylated lignin amine salts of the lignin by-products of the black liquor residue of a kraft wood-pulping process. Such amine salts of lignosulfonates are particularly suited for use as additives in dyestuffs, pesticides, and other chemical compounds, and their production is disclosed in co-pending, commonly assigned U.S. patent application Ser. No. 783,781, filed Oct. 3, 1985, U.S. Pat. No. 4,232,572. It has been found that sulfonated lignin salts containing a cation having a relatively low disassociation constant and pKa, such as the amine salts, have less tendency when used as a dispersant to cause azo dyestuff reduction. More particularly, lignosulfonate salts formed from reaction with an amine having a relatively low pKa, e.g., triethanolamine, diethanolamine, monoethanolamine, when used as dispersant in an azo dyestuff-containing dye system, causes less color reduction of the azo dyestuff than is the case in the use of the higher pKa lignin salts, such as sodium or ammonium.

As disclosed in the aforesaid co-pending application Ser. No. 783,781, amine salts of lignosulfonates may be prepared by (1) methylolating a lignin material, such as the lignin by-product of a kraft pulping process in alkaline liquid medium, (2) lowering the pH of the liquid to an acid pH to precipitate the methylolated lignin, (3) washing the precipitated methylolated lignin with water to remove inorganic salts and other impurities, and (4) thereafter reacting the purified methylolated lignin with an amine compound and a sulfur-oxygen-containing compound under moderately acid to neutral conditions to produce the lignosulfonate amine salt.

As set forth in co-pending, commonly assigned U.S. Patent application Ser. No. 859,384, U.S. Pat. No. 4,715,864 it has been more recently proposed to modify existing sulfonated lignin salts containing cations having relatively high disassociation constants and pKa's, e.g. sodium and ammonium, by addition of an amine compound having a lower disassociation constant and pKa, resulting in lignin salt compositions causing less color reduction of azo dyestuffs than unmodified higher pKa lignin salts. Decreased azo dyestuff reduction is believed to be brought about due to the capability of electrolytes to disassociate into two or more ions such that an equilibrium reaction takes place whereby the higher pKa lignosulfonate salt, e.g., sodium, and the lower pKa cation, e.g., amine, will re-arrange to equilibrate over time in a predictable association pattern. Thus, when the amine associates with the lignin to replace the sodium, lignin oxidation is inhibited, hence, so is azo dye reduction.

For economy of storage, shipment, and subsequent use, it is desirable to produce lignosulfonate salt additives in a dry form, rather than in a liquid slurry or solution. On a commercial basis, sodium salt lignosulfonates are produced in dry powder form by spray-drying the lignin salts after sulfonation. Conventional spray-drying equipment for carrying out such a spray-drying operation is disclosed in U.S. Pat. No. 2,081,909. In producing lignosulfonate amine salts, however, they have been found difficult to spray-dry, and heretofore have only been practically producable in a liquid medium or form. The difficulty of spray-drying amine salts is believed due to the presence of excess amine-containing compound which is necessary to raise the pH of the methylolated lignin slurry to the moderately acid to neutral level, e.g., above about 6, for the sulfonation reaction to be carried out on a commercially economical level. Triethanolamine, one typical amine employed in the production of the sulfomethylated lignin salts, is a weak base, and the amount required to raise the pH of the system to a point where sulfonation can proceed economically results in a lowering of the melting point of the reaction product and build-up of semi-molten material on the walls of the spray-dryer in subsequent spray-drying operations.

Various spray-drying approaches have been attempted to produce an effective, low-staining, non-reducing sulfonated lignin amine salt product. Adjustments of pH between 5.5 and 8.0 showed no noticable improvement in recovery. Additions of anti-static agent also met with no success. Although lowering dryer inlet temperatures from the normal operating spray-drying temperature of 260° C. to 221° C., increased recovery, the concommitant reduction in feed rate was not economically feasible.

BRIEF OBJECTS OF THE INVENTION

It is therefore an object of the present invention to provide an improved method of producing amine-containing salts of lignosulfonates in a dry form particularly suited for storage, handling, and shipment for use as an additive in other chemical compositions, such as dyestuffs.

It is a further object to provide an improved method of producing amine-containing salts of lignosulfonates suited for use in spray-dried, dry powder form as additives in chemical compositions and which provides more economical storage, handling, and shipment of the same to customers for ultimate use.

BRIEF SUMMARY OF THE INVENTION

The present invention is directed to a method of producing an amine-containing salt of a lignosulfonate compound which may be effectively spray-dried for storage, shipment, and use in dry powder or granule form comprising the steps of methylolating a lignin compound at an alkaline pH, e.g., between about 9 and 11, as by reaction with an aldehyde, lowering the pH of the methylolated lignin to precipitate the lignin, lowering the lignin to an acid pH and washing the precipitated lignin to remove impurities, sulfonating the washed methylolated lignin by simultaneous reaction with a sulfur-oxygen-containing compound, an amine compound, and an ammonium-containing compound, and evaporating excess ammonia from the sulfonated reaction product, as during spray-drying.

More specifically, it has been found that by utilizing an ammonium-containing compound, e.g., ammonium hydroxide, in place of the excess amine compound heretofore employed to raise the reaction pH to a point where sulfonation can occur, the amine compound is sufficient to produce the desired lignin amine salt, while the ammonium in excess of the amount necessary for the reaction is removed from the reaction product by vaporization as ammonia. Thus, the resultant amine-containing salt of the sulfonated lignin may be effectively spray-dried without the deliterious effects heretofore experienced in sticking and solidification of the lignosulfonate amine salt in the drying apparatus due to presence of excess amine.

In particular, it has been found that the sulfonation reaction is more preferably carried out, on a commercial level at a reaction pH of above 6. In such case, the molar ratio of the amine compound to the sulfur-oxygen-containing compound, e.g., sulfur dioxide, preferably should be maintained, as follows:

$$\text{moles amine compound} \leqq 1.25 \text{ (moles SO}_2\text{)} + 0.5 \text{ moles}$$

This formula, expressing the molar ratios based on 1,000 gram moles of lignin, is such that it provides amine compound in an amount sufficient to produce the desired sulfonation amine salt reaction product, but the amount of amine compound is not present in sufficient quantities to raise the pH to a minimum where sulfonation can effectively proceed.

DETAILED DESCRIPTION OF PREFERRED EMBODIMENTS

As mentioned above, the method of the present invention provides an improved amine-containing lignosulfonate compound which may be effectively dried for subsequent storage, sale, and use in a dry form, typically a powder or granule. By providing only sufficient amine compound during the sulfonation reaction to produce the amine-containing salt, and by utilizing a vaporizable ammonium compound in sufficient amounts to raise the pH to the reaction pH desired, excess amine compound and spray-drying difficulties are avoided.

Typical of the many organic amine compounds which may be employed in preparation of the lignin amine-containing salts of the present invention include triethylamine, triethanolamine, diethanolamine, dimethylamine, monoethanolamine, propylene diamine, cyclohexylamine, diethylene tetraamine, and tetraethylene pentamine. Triethanolamine is particularly perferred for commercial use because of its availability, economy, and relative ease of use in the method of the present invention.

As the ammonium-containing compound or component, ammonium hydroxide may be employed and preferred because of its ready availability, ease of use, and economy. As the sulfur-oxygen-containing component, $SO_2$ gas may be typically employed in the sulfonation reaction. The ammonium component and the sulfur-oxygen component may be supplied in a single compound, such as ammonium sulfite or ammounium bisulfite, to carry out the sulfonation reaction, or combinations of the same might be utilized.

The following examples illustrate methods of production of amine-containing salts of sulfomethylated lignins in dry granule or powder form for subsequent storage and shipment and use as a dyestuff additive.

EXAMPLE I

An amine salt of a sulfomethylated lignin compound having a degree of sulfonation of 1.0 is prepared, as follows:

1. Lignin recovered as a by-product from a kraft pulping process is prepared in an aqueous slurry form containing 29–31% solids lignin.
2. The pH of the slurry is adjusted to 10.8 to 11.2 with sodium hydroxide.
3. The pH adjusted slurry is heated to 74° C.–76° C. and 2.7 pound moles formaldehyde per 1,000 pounds lignin solids in the slurry is added thereto.
4. The temperature of the slurry is maintained for 8 hours to methylolate the lignin.
5. Water is added to adjust the methylolated lignin slurry to 20% solids and 0.1 pound mole ammonium hydroxide per 1,000 pounds lignin solids is added thereto.
6. The methylolated lignin slurry is isolated by adding dilute sulfuric acid to a pH of 2–2.5 and purified by filtering with a water wash.
7. The methylolated lignin slurry is adjusted to 20% solids and 1.0 pound mole triethanolamine, 1.7 pound moles ammonium hydroxide, and 1.7 pound moles sulfur dioxide per 1,000 pound moles of lignin are added to the slurry. The pH is adjusted to 7.0–7.2 with ammonium hydroxide and heated to a temperature of 96° C.–100° C. for 8 hours to carry out the sulfonation reaction.
8. The sulfonated reaction product is heated to evaporate water and thereafter spray-dried using a Bowen-type laboratory spray-dryer described in U.S. Pat. No. 2,081,909. During evaporation and spray-drying, ammonia gas is also evaporated and removed from the spray-dried product. Using a spray-dryer inlet temperature of 260° C. and an outlet temperature of 121° C., the lignosulfonate amine salt in dry powder or granule form is produced, with 73.8% of the initial starting lignin solids being effectively recovered in the final product. A similarly prepared lignin amine salt utilizing 3 pound moles of triethanolamine without addition of an ammonium compound or component in the sulfonation reaction, when subjected to spray-drying, provided a lignin amine salt recovery in dry form of only 32.8% of the starting lignin solids.

EXAMPLE II

An amine salt of a sulfomethylated lignin compound having a degree of sulfonation of 0.6 is prepared, as follows:

1. Lignin recovered as a by-product from a kraft pulping process is prepared in an aqueous slurry form containing 29–31% solids lignin.
2. The pH of the slurry is adjusted to 10.8 to 11.2 with sodium hydroxide.
3. The pH-adjusted slurry is heated to 74° C.–76° C. and 2.7 pound moles formaldehyde per 1,000 pounds lignin solids in the slurry is added thereto.
4. The temperature of the slurry is maintained for 8 hours to methylolate the lignin.
5. Water is added to adjust the methylolated lignin slurry to 20% solids and 0.1 pound mole ammonium hydroxide per 1,000 pounds lignin solids is added thereto.
6. The methylolated lignin slurry is isolated with dilute sulfuric acid to a pH of 2–2.5 and filtered with a water wash.
7. The methylolated lignin slurry is adjusted to 20% solids and 1.0 pound mole triethanolamine, 1.5 pound moles ammonium hydroxide, and 1.5 pound moles sulfur dioxide per 1,000 pound moles of lignin are added to the slurry. The pH is adjusted to 7.0–7.2 with ammonium hydroxide and heated to a temperature of 95° C.–100° C. for 8 hours to carry out the sulfonation reaction.
8. The sulfonated lignin amine salt is heated to evaporate water and spray-dried in accordance with the procedures set forth in Example I during which time excess ammonia is removed from the spray-dried product.

The resultant product is characterized by a dry granule powder form without noticeable sticking or loss of product due to build-up of semi-molten material on the walls of the spray-dryer.

EXAMPLE III

An amine salt of a sulfomethylated lignin compound having a degree of sulfonation of 1.3 moles is prepared, as follows:

1. Lignin recovered as a by-product from a kraft pulping process is prepared in an aqueous slurry form containing 25% solids lignin.
2. The pH of the slurry is adjusted to 11.0 by addition of 50% solution of sodium hydroxide and is heated to a temperature of 85° C.
3. 3.5 gram moles of formaldehyde are added per 1,000 gram moles of the lignin solids, and the temperature maintained for 3 hours to methylolate the lignin.
4. The methylolated lignin is precipitated and isolated by addition of dilute sulfuric acid at a pH of 2.0–2.5, and is heat coagulated with direct steam at 85° C.
5. The lignin is washed with water until the effluent reaches a pH of 3.5.
6. The methylolated lignin is adjusted to a 19–21% solids aqueous slurry. 1.3 pound moles of triethanolamine and 2.3 pound moles ammonium bisulfite per 1,000 moles of lignin are added to the slurry and the pH adjusted to 7.0 with ammonium hydroxide.
7. The slurry is heated for 1 hour at 100° C. and the temperature raised to 130° C. for 3 hours to carry out the sulfonation reaction.
8. The sulfonated material is treated to evaporate water and is spray-dried with removal of ammonia by vaporization utilizing the procedures described in Example I. The resultant dry product is characterized by a dry granule powder form, without noticeable sticking or loss of product due to build-up of semi-molten material on the wall of the spray-dryer.

EXAMPLE IV

An amine salt of a sulfomethylated lignin compound having a degree of sulfonation of 1.8 moles is prepared, as follows:

1. Lignin recovered as a by-product from a kraft pulping process is prepared in an aqueous slurry form containing 25% solids lignin.
2. The pH of the slurry is adjusted to 11.0 with 50% sodium hydroxide and heated to 70° C.
3. 3.5 moles of formaldehyde per 1,000 gram moles of lignin are added to the slurry, and the temperature maintained for 2 hours to methylolate the lignin.
4. The methylolated lignin is precipitated by addition of sulfuric acid to a pH of 2.0–2.5.
5. The isolated lignin is washed with water until the effluent pH is greater than 3.5.

6. The methylolated lignin slurry is adjusted to a 20% solids content, and 1.7 pound moles triethanolamine and 3.5 pound moles ammonium bisulfite per 1,000 pound moles of lignin are added to the slurry.

7. The pH of the lignin slurry is adjusted to 7.0–7.2 by addition of ammonium hydroxide and reacted at 120° C. for 1 hour. The temperature is raised in a pressure reactor to 160° C. and maintained for 3 hours to carry out the sulfonation reaction.

8. The sulfonated material is heated to evaporate water and spray-dried with removal of ammonia by vaporization utilizing the technique set forth as in Example I. The resultant spray-dried lignin amine salt is effectively recovered in dry form without appreciable loss of product due to sticking in the dryer.

That which is claimed is:

1. A method of producing an amine-containing salt of a lignosulfonate compound which may be effectively spray-dried for use in dry form comprising the steps of
   (a) methylolating a lignin compound at an alkaline pH;
   (b) lowering the pH of the methylolated lignin to precipitate the lignin;
   (c) washing the precipitated lignin at an acid pH to remove impurities;
   (d) sulfonating the methylolated lignin in the presence of a sulfur-oxygen-containing compound, an amine compound, and an ammonium-containing compound to produce an amine salt thereof; and
   (e) heating and spray-drying the sulfonated lignin amine salt while evaporating ammonia therefrom to produce a sulfonated lignin amine salt in dry form.

2. A method as defined in claim 1 wherein the methylolated lignin is sulfonated at a pH of above 6, and the moles of amine compound present in the sulfonation reaction are equal to or less than 1.25 times the moles of sulfur dioxide present, plus 0.5 moles amine compound.

3. A method as defined in claim 2 wherein the amine compound is triethanolamine, the sulfur-oxygen-containing compound is sulfur dioxide, and the ammonium-containing compound is ammonium hydroxide.

4. A method as defined in claim 2 wherein the sulfur-oxygen-containing compound and the ammonium-containing compound is ammonium bisulfite.

5. A method as defined in claim 1 wherein the amine compound is triethanolamine, the sulfur-oxygen-containing compound is sulfur dioxide, and the ammonium-containing compound is ammonium hydroxide.

6. A method as defined in claim 1 wherein the sulfur-oxygen-containing compound and the ammonium-containing compound is ammonium bisulfite.

* * * * *